(12) United States Patent
Masson et al.

(10) Patent No.: US 8,707,669 B2
(45) Date of Patent: Apr. 29, 2014

(54) METHOD FOR MANUFACTURING A FIBER-REINFORCED METAL CONNECTING ROD, AND RESULTING CONNECTING ROD

(75) Inventors: Richard Masson, Les Loges en Josas (FR); Patrick Dunleavy, Palaiseau (FR); Jean-Michel Franchet, Paris (FR); Gilles Klein, Mery sur Oise (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 103 days.

(21) Appl. No.: 13/395,219

(22) PCT Filed: Sep. 13, 2010

(86) PCT No.: PCT/EP2010/005594
§ 371 (c)(1),
(2), (4) Date: Mar. 9, 2012

(87) PCT Pub. No.: WO2011/029620
PCT Pub. Date: Mar. 17, 2011

(65) Prior Publication Data
US 2012/0174700 A1    Jul. 12, 2012

(30) Foreign Application Priority Data

Sep. 11, 2009 (FR) ...................... 09 04369

(51) Int. Cl.
*C22C 47/00* (2006.01)
*C22C 47/20* (2006.01)
(52) U.S. Cl.
USPC .......... 59/35.1; 59/78; 59/84; 59/901; 74/581
(58) Field of Classification Search
USPC .............. 59/35.1, 78, 84, 90, 92, 901; 74/581
See application file for complete search history.

(56) References Cited

U.S. PATENT DOCUMENTS

| | | | | | |
|---|---|---|---|---|---|
| 3,153,898 A | * | 10/1964 | Gerhardt | ............................ | 59/84 |
| 3,434,373 A | * | 3/1969 | Ditlinger | ......................... | 74/581 |
| 3,733,811 A | * | 5/1973 | Florjancic | ...................... | 59/35.1 |
| 4,552,035 A | * | 11/1985 | Skipper | ............................. | 59/84 |
| 4,757,681 A | * | 7/1988 | Matsuno et al. | .................... | 59/84 |
| 4,932,927 A | * | 6/1990 | Fillar | ................................. | 59/84 |
| 5,215,616 A | * | 6/1993 | Fillar | ................................. | 59/84 |
| 5,269,129 A | * | 12/1993 | Lundy | ............................... | 59/78 |
| 6,849,016 B2 | * | 2/2005 | Ashtiani et al. | ................. | 59/78.1 |
| 8,161,723 B2 | * | 4/2012 | de Vries | ............................ | 59/78 |

FOREIGN PATENT DOCUMENTS

| | | |
|---|---|---|
| FR | 2 925 896 A1 | 7/2009 |
| FR | 2 925 897 A1 | 7/2009 |
| WO | WO 2010/001068 A2 | 1/2010 |
| WO | WO 2010/001069 A2 | 1/2010 |

\* cited by examiner

*Primary Examiner* — David B Jones
(74) *Attorney, Agent, or Firm* — Sughrue Mion, PLLC

(57) ABSTRACT

The present invention relates to a method of fabricating a metal link rod (6) that is longitudinally reinforced in its thickness by fiber reinforcement (2), the method comprising the following steps:

making a metal blank including at least one longitudinal housing (11, 12) leading into an edge face of the blank;
    inserting fiber reinforcement (2) in the housing;
    connecting the fiber reinforcement to the blank by metal diffusion around the fibers of the fiber reinforcement (2); and
    finishing the blank in order to obtain a link rod (6).

The invention also provides a link rod having a metal matrix in which reinforcing fibers are embedded that extend on either side of a longitudinal axis (X) of the link rod, the fibers leading into an edge face of the link rod.

4 Claims, 2 Drawing Sheets

METHOD FOR MANUFACTURING A FIBER-REINFORCED METAL CONNECTING ROD, AND RESULTING CONNECTING ROD

CROSS REFERENCE TO RELATED APPLICATIONS

This application is a National Stage of International Application No. PCT/EP2010/005594 filed Sep. 13, 2010, claiming priority based French Patent Application No. 09 04369, filed Sep. 11, 2009, the contents of all of which are incorporated herein by reference in their entirety.

The present invention relates to a method of obtaining a composite link rod made up of a metal matrix reinforced by fibers, in particular ceramic fibers, and also to a link rod as obtained thereby.

BACKGROUND OF THE INVENTION

Composite link rods are known that comprise a matrix made of metal or metal alloy, in particular a titanium alloy, which matrix is reinforced by fiber reinforcement comprising ceramic fibers sheathed in the same metal as the matrix.

Thus, patent application WO 2009/034264 discloses a method of fabricating a link rod of this type. In that method, pieces of fiber reinforcement are made initially in which the fibers extend parallel to one another and are bonded together. Thereafter, the pieces of reinforcement are placed in longitudinal grooves in a metal blank that is to constitute the link rod, the grooves defining housings of finite length that receive the pieces of fiber reinforcement. The assembly is subjected to hot isostatic compression, thereby having the effect of intimately bonding the fibers with the metal of the blank. All that then remains to be done is to machine the blank in order to obtain the finished link rod.

OBJECT OF THE INVENTION

An object of the present invention is to provide a method of fabricating a composite link rod that is simplified compared with existing solutions.

SUMMARY OF THE INVENTION

To this end, the present invention relates to a method of fabricating a metal link rod that is longitudinally reinforced in its thickness by fiber reinforcement, the method comprising the following steps:
  making a metal blank having at least one longitudinal housing leading into an edge face of the blank;
  inserting fiber reinforcement into the housing;
  bonding the fiber reinforcement to the blank by metal diffusion around the fibers of the fiber reinforcement; and
  finishing the blank to obtain a link rod.

According to the invention, the fiber reinforcement is inserted by means of the following operations:
  previously placing the fiber reinforcement on a support in the form of an angle bar; and
  inserting the angle bar carrying the corresponding fiber reinforcement in the housing.

Thus, the fiber reinforcement may extend longitudinally over the entire length of the blank, thereby simplifying putting the reinforcement into place into the housing. Previously placing the fiber reinforcement on the angle bar support makes it easier to put into place in the housing. Naturally, the support is made out of the same metal as the blank. Furthermore, the housing may be obtained by extruding the blank, or by longitudinal machining without in-feed, thereby making the blank easier to make.

This method gives rise to link rods in which the fiber reinforcement that extends along the entire length of the rod leads into an edge face thereof. This feature does not significantly modify the mechanical properties of the link rod. Depending on the environment in which the link rod is to operate, it may be appropriate to protect the edge faces of the longitudinal ends of a link rod with a suitable paint or coating.

In addition, the portion of the fiber reinforcement that is eliminated during finishing of the link rod may be used as a test piece suitable for being inspected and/or tested after the link rod has been fabricated, with this not being possible when a piece of reinforcement is contained in full inside a housing that does not lead into an end face.

The invention also provides the following method:
  making a metal section member of constant section and including at least two longitudinal housings;
  inserting a respective piece of fiber reinforcement in each of the housings, the insertion of the fiber reinforcement comprising initially placing fiber reinforcement on a support in the form of an angle bar and then inserting each angle bar carrying the corresponding fiber reinforcement in one of the housings;
  applying hot isostatic compression to the assembly in order to obtain a reinforced bar;
  cutting up the reinforced bar in order to make a plurality of link-rod blanks; and
  finishing each blank in order to obtain reinforced link rods.

The method of the invention thus makes it possible to simplify considerably the fabrication of a composite link rod. Unlike the method described in above-mentioned document WO 2009/034264-A2, the link rod may be obtained using the invention with a smaller total number of fabrication steps. With the method of the invention, link rods are no longer fabricated one by one, but as a series from a reinforced bar. In particular, there is only one step of inserting fiber reinforcement and only one step of implementing metal diffusion for all of the resulting link rods.

BRIEF DESCRIPTION OF THE DRAWINGS

The present invention can be better understood on reading a detailed implementation described with reference to the accompanying drawings that are given by way of non-limiting example and in which.

All of the figures are highly diagrammatic and are not necessarily to scale between the various components shown in order to make them easier to read, with each of the elements shown conserving the same references in each of the figures in which they are shown.

DETAILED DESCRIPTION OF THE INVENTION

Figure 1:
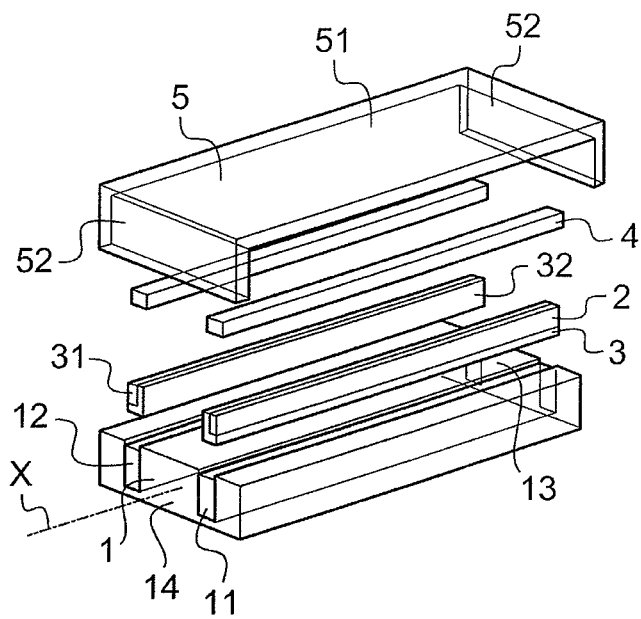
FIG. 1 is an exploded view of the reinforced metal bar from which link rods of the invention are obtained.
Figure 2:
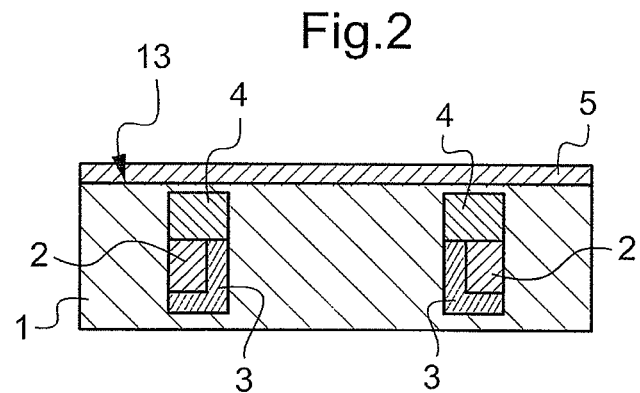
FIG. 2 is a cross-section of the FIG. 1 reinforced metal bar.
Figure 3:
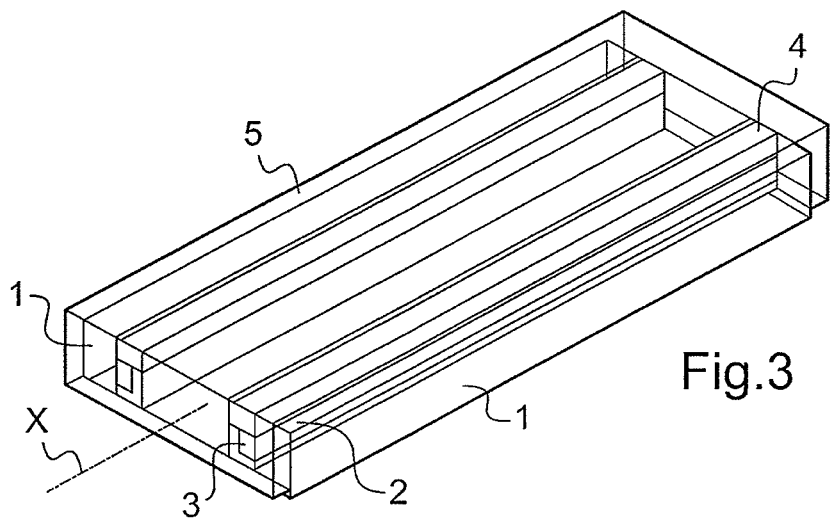
FIG. 3 shows the FIG. 1 reinforced metal bar in perspective and in transparency.

The method of the invention comprises the following sequence of steps:

Firstly, and as shown in FIGS. 1 to 3, a metal section member 1 is made, here by extruding a titanium alloy. The section member 1 extends along a longitudinal axis of symmetry X and presents a section that is constant. The section member 1 has two open-ended housings 11 and 12 disposed symmetrically on either side of the axis X. In this example the housings are in the form of grooves of square or rectangular cross-section.

Furthermore, two pieces of fiber reinforcement 2 are prepared. The pieces of fiber reinforcement 2 may in particular be obtained using the method described in above-mentioned patent WO 2009/034264, and in this example they comprise metal-sheathed ceramic fibers, specifically silicon carbide fibers in sheaths made of the same metal alloy as the section member 1. Each of the pieces of fiber reinforcement 2 is arranged on a respective angle bar 3 that defines a bottom 31 and a side wall 32. The fibers extend in a longitudinal direction parallel to one another.

Thereafter, the angle bars 3 carrying the fiber reinforcement 2 are inserted in the housings 11, 12 of the section member 1. For this purpose, the angle bars 3 are of dimensions that enable them to be placed in the bottoms of the housings 11 and 12, substantially covering the entire bottom surfaces of the housings 11, 12.

Once the angle bars 3 have been inserted on the bottoms of the housings 11, 12, there remains an empty space in each housing 11, 12 above its angle bar 3, which space is filled by inserting a filler block 4 in each of the housings 11, 12, the filler blocks 4 being made of the same alloy as the section member 1 and the angle bars 3. The top faces of the filler blocks 4 lie flush with the top face 13 of the section member 1.

Thereafter, a thin metal cover 5 is placed on the top face 13 of the section member 1, the cover 5 in this example being made as a single sheet of metal having a top wall 51 and two end walls 52. It is of dimensions that are adapted to ensure that its top wall 51 covers the top face 13 of the section member 1 in full, and its end walls 52 cover the end faces 14 of the section member 1 in full. The cover 5 is welded to the section member, so as to close the assembly and encapsulate the pieces of fiber reinforcement 2.

The assembly comprising the section member, the pieces of fiber reinforcement, and the filler blocks is then put into a vacuum, after which the assembly is subjected to hot isostatic compression, so as to cause the metal to diffuse around the fibers.

Figure 4:
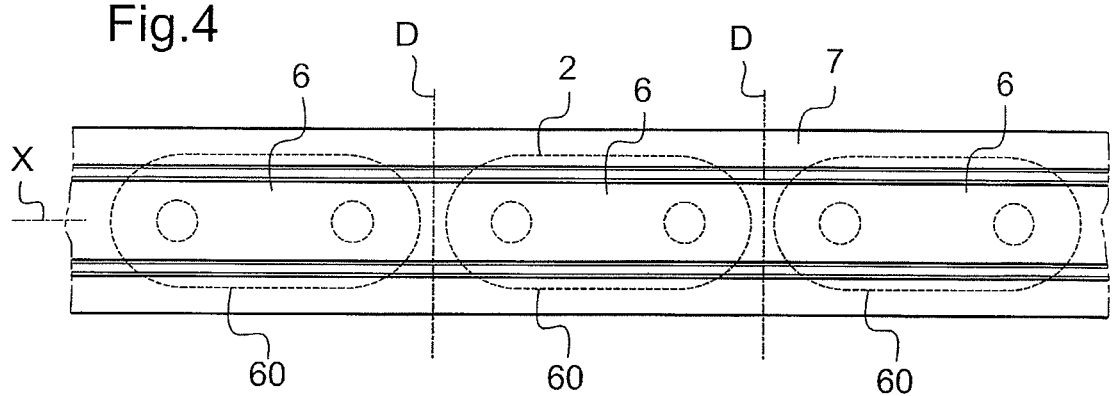
FIG. 4 is a plan view of the assembly of the FIG. 1 reinforced metal bar with lines for cutting out link rods being shown.

This produces a reinforced bar 7 made up of a metal matrix of titanium alloy that is reinforced by carbide fibers extending in two longitudinal zones corresponding substantially to the zones of the initial housings 11, 12, as shown in FIG. 4.

Figure 5:
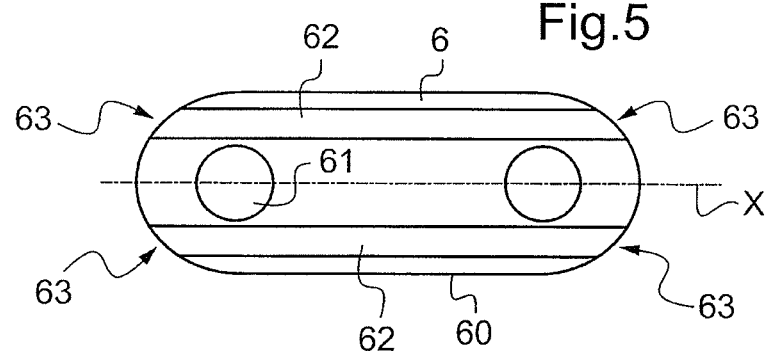
FIG. 5 is a transparent plan view of a link rod obtained after cutting out the reinforced metal bar along the lines for cutting out shown in FIG. 4.

Thereafter, the reinforced bar 7 is cut up, e.g. along lines for cutting out D as shown in FIG. 4 so as to obtain a plurality of link rod blanks 6. The blanks are then machined in order to obtain link rods. This machining comprises trimming the link rods to have profiles 60, and piercing orifices 61 at each of their ends, as shown in FIG. 5, the orifices in this example extending between the two longitudinal zones of reinforcement. In this figure, it can be seen that the fibers open out into zones 63 of the end faces of the link rod.

The link rod may then be fitted with rings, and may receive a protective coating, in particular for the purpose of protecting the edge faces of the link rod.

Figure 6:
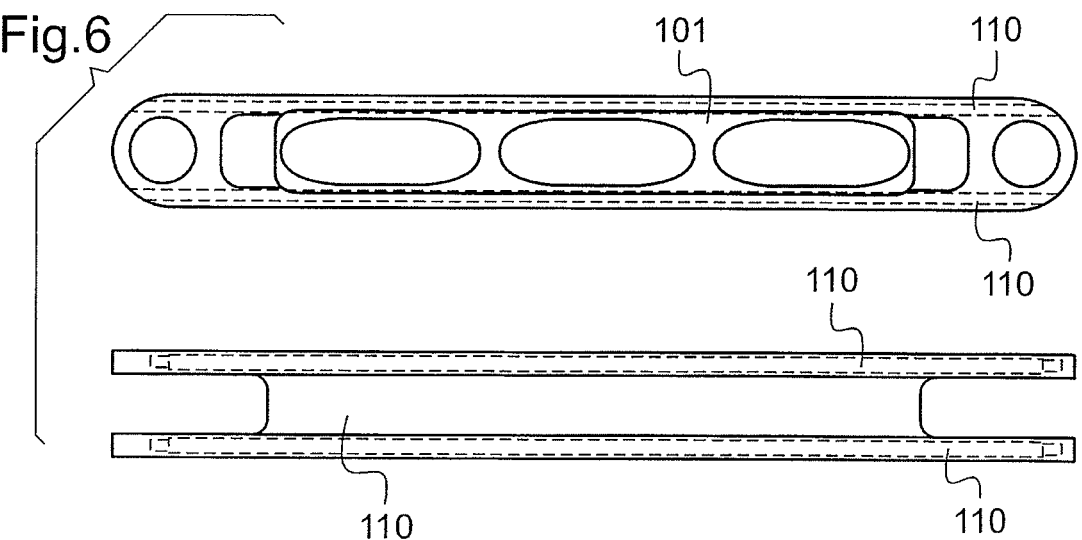
FIG. 6 is a face view from above of a link rod of the invention.

FIG. 6 shows the invention implemented for a link rod 101 that is provided with four pieces of fiber reinforcement of the invention.

The invention is not limited to the implementation described above, but on the contrary covers any variant using equivalent means to reproduce the essential characteristics set out above.

Furthermore, in the context of the invention, the term "metal section member" does not restrict the member being obtained by a method of extrusion through a die of appropriate shape: although extrusion is a method that is particularly suited for this type of member, it is possible to obtain such a member by other methods that are known in the field of metal-working.

Finally, although the fiber reinforcement described herein is constituted by metal-sheathed ceramic fibers, which reinforcement may be obtained in particular in accordance with the teaching of patent WO 2009/034264, the invention also covers link rods including pieces of other types of fiber reinforcement, and in particular reinforcement in the form of ceramic fibers that are inserted directly in the housings in the section member.

Although in the example described, provision is made to insert metal blocks in the grooves so as to fill the space left empty above the fiber reinforcement after it has been inserted in the housings, it is also possible to arrange for the pieces of fiber reinforcement to fill the housings made in the section member completely.

Finally, although it is advantageous from an industrial point of view to make a bar of a length that is sufficient to enable it to be cut up into shorter rods, the invention may naturally be applied to a unitary blank that is to receive the pieces of fiber reinforcement and then be finished.

The invention claimed is:

1. A method of fabricating a metal link rod (6) that is longitudinally reinforced in a thickness of the metal link rod by fiber reinforcement (2), the method comprising the following steps:

making a metal blank having at least one longitudinal housing (11, 12) opening out into an edge face of the blank;

inserting fiber reinforcement (2) into the housing;

bonding the fiber reinforcement to the blank by metal diffusion around the fibers of the fiber reinforcement (2); and finishing the blank to obtain a link rod (6);

wherein the fiber reinforcement is inserted by means of the following operations:

placing the fiber reinforcement on a support in the form of an angle bar; and then inserting the angle bar carrying the corresponding fiber reinforcement in the housing.

2. A link rod (6) suitable for being obtained by the method according to claim 1, the link rod comprising a metal matrix having reinforcing fibers embedded therein lying on either side of a longitudinal axis (X) of the link rod, the fibers leading into an edge face of the link rod.

3. A method of fabricating a metal link rod (6) that is longitudinally reinforced in a thickness of the metal link rod by fiber reinforcement (2) extending parallel to a longitudinal direction of the link rod, the method comprising the following steps:

making a metal section member (1) of constant section and including at least two longitudinal housings (11, 12);

inserting a respective piece of fiber reinforcement (2) in each of the housings, the insertion of the fiber reinforcement comprising the steps of placing fiber reinforcement on a support in the form of an angle bar and then inserting each angle bar carrying the corresponding fiber reinforcement in one of the housings;

applying hot isostatic compression to the assembly in order to obtain a reinforced bar;

cutting up the reinforced bar in order to make a plurality of link-rod blanks; and finishing each blank in order to obtain reinforced link rods.

4. A method of fabricating a metal link rod (6) that is longitudinally reinforced in a thickness of the metal link rod by fiber reinforcement (2), the method comprising the following steps:

making a metal blank having at least one longitudinal housing (11, 12) leading into an edge face of the blank;

inserting fiber reinforcement (2) into the housing;

bonding the fiber reinforcement to the blank by metal diffusion around the fibers of the fiber reinforcement (2); and finishing the blank to obtain a link rod (6);

wherein the fiber reinforcement is inserted by means of the following operations:

placing the fiber reinforcement on a support in the form of an angle bar, the angle bar being made of an alloy; and then inserting the angle bar carrying the corresponding fiber reinforcement in the housing; and wherein any remaining space of the housing is filled by inserting a filler block (4) made of an alloy that is the same as the alloy of the angle bar.

* * * * *